July 22, 1924.
L. A. RIEDESEL
1,502,529
AGRICULTURAL IMPLEMENT
Filed June 5, 1924　　2 Sheets-Sheet 1
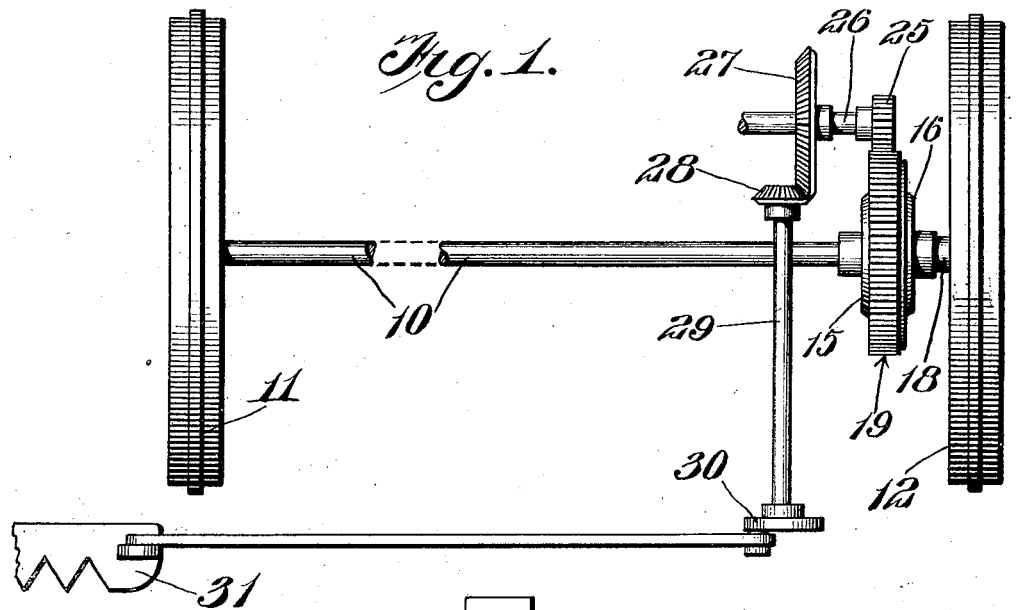
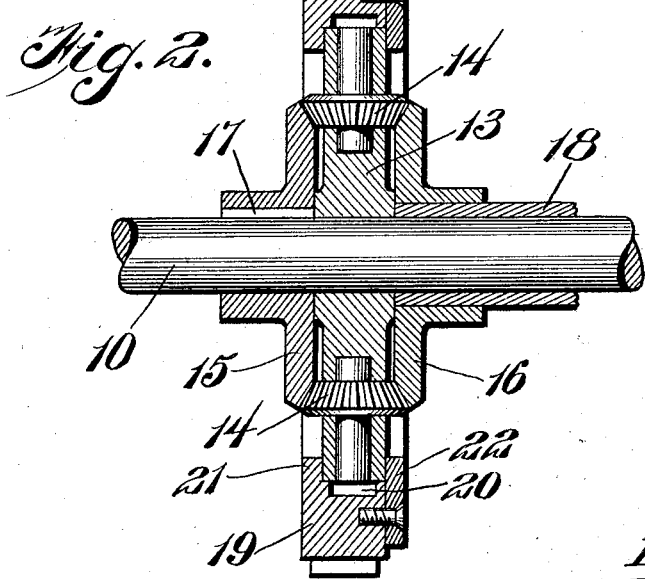
Inventor
Louis A. Riedesel
Watson E. Coleman
Atty

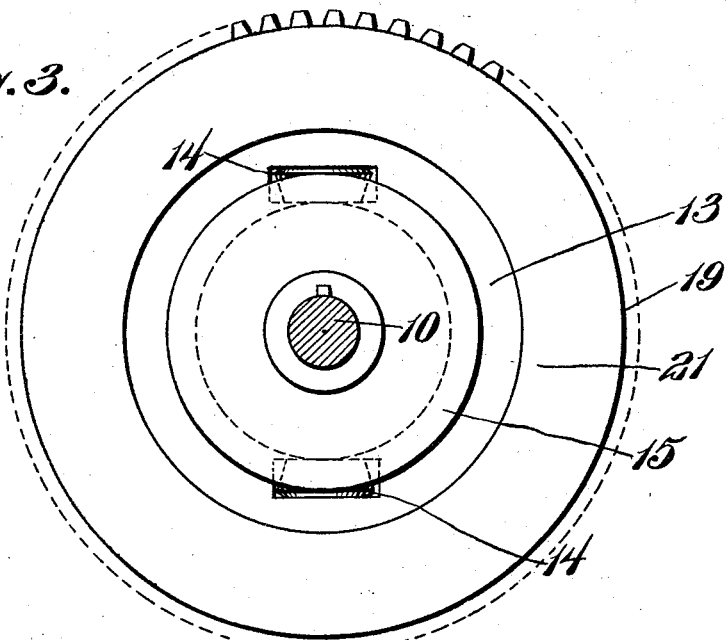
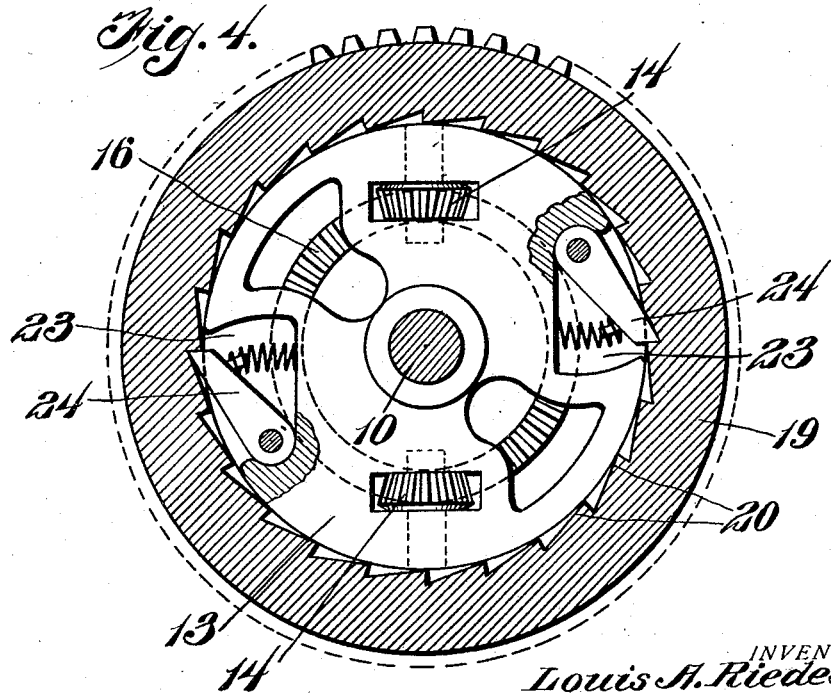

Patented July 22, 1924.

1,502,529

UNITED STATES PATENT OFFICE.

LOUIS A. RIEDESEL, OF WHEATLAND, IOWA.

AGRICULTURAL IMPLEMENT.

Application filed June 5, 1924. Serial No. 718,115.

*To all whom it may concern:*

Be it known that I, LOUIS A. RIEDESEL, a citizen of the United States, residing at Wheatland, in the county of Clinton and State of Iowa, have invented certain new and useful Improvements in Agricultural Implements, of which the following is a specification, reference being had to the accompanying drawings.

This invention relates to an improvement in agricultural implements and more particularly to that type of agricultural implement in which the wheels are employed as a drive for a cutter bar, seeder or the like.

An important object of the invention is to provide in a device of this character a drive connecting the wheels of the driven element which will provide a drive for the driven element which is uniform to the speed of the movement of the agricultural implement and which is automatically disconnected when the movement of the implement is reversed.

A further object of the invention is to provide a device of this character which may be readily applied to different types of agricultural implements without materially changing the present construction thereof.

A further object of the invention is to provide a device of this character particularly adapted for use in connection with a drive for the cutter bars of reapers.

These and other objects I attain by the construction shown in the accompanying drawings, wherein for the purpose of illustration is shown a preferred embodiment of my invention and wherein:—

Figure 1 is a fragmentary plan view showing a drive constructed in accordance with my invention applied to a reaper to drive the cutter bar thereof;

Figure 2 is a vertical sectional view through the drive;

Figure 3 is a side elevation of the drive mechanism;

Figure 4 is a sectional view at right angles to that shown in Figure 2.

Referring now more particularly to the drawings, in which a reaper is generally illustrated, the numeral 10 indicates the axle of the implement upon which are mounted a pair of ground wheels 11 and 12. One of these ground wheels 11 is directly secured to the axle, while the ground wheel 12 is rotatable thereon. Rotatably mounted upon the axle adjacent the wheel 12 is a differential spider 13 bearing circumferentially spaced drive pinions 14. Mounted upon the axle at opposite sides of the spider are gears 15 and 16, the gear 15 or that gear next adjacent the wheel 11 being secured to the axle, as indicated at 17, while the gear 16 is rotatable upon this axle. To this gear 16 is secured the inner end of a sleeve 18 the outer end of which is secured to the wheel 12 to be rotated thereby.

Seated upon the periphery of the spider is an annular ring gear 19 the inner surface of which is provided with ratchet teeth 20. This ring gear is provided at one side with an inwardly integral flange 21 and at its opposite side with an annular ring 22 which is secured thereto, providing at this side of the periphery a removable flange. These flanges 21 and 22 maintain the ring gear in position upon the differential spider. Carried by the spider and projecting through notches 23 formed in the periphery thereof are a plurality of spring-pressed dogs 24 for coaction with the ratchet teeth 20. The ratchet teeth and dogs are so constructed that they disconnect the ring gear 22 during reverse motion of the agricultural implement and connect the same during forward motion thereof.

The teeth of the ring gear 19 mesh with a pinion 25 which, through a shaft 26, gear 27, pinion 28 and shaft 29 may be connected with the cutter bar disk 30 of the mower blade disks 31. It will be seen that with a device of this character inequal operation of the wheels during passage over inequalities of the ground and in turning corners and making curved cuts will not result in noisy operation as usually results from the ordinary construction of devices of this type in which the ratchets included in the wheels proper are depended on to compensate for these differences. It will furthermore be obvious that during reverse motions the cutter bar or analogous mechanism driven from the wheels will be completely disconnected during all reverse movements of the implement.

Many changes being possible in the construction of the device as hereinbefore set forth without materially departing from the spirit of my invention, I do not limit myself to such specific structure except as hereinafter claimed.

I claim:—

1. In combination with an agricultural implement having a member to be driven, an axle and a pair of supporting wheels on the axle, one of the wheels being fixed to the axle, the other of the wheels being rotatable upon the axle, opposed gear wheels mounted upon the axle and one secured to the axle and the other to the first named wheel, a spider rotatably mounted upon the axle between said gear wheels and bearing pinions meshing with both of said gear wheels, an annulus mounted upon the periphery of the spider, means connecting the annulus to the spider during rotation of the spider in one direction and disconnecting the same during rotation of the spider in the opposite direction, and a connection between the annulus and the member to be driven.

2. In combination with an agricultural implement having a member to be driven, an axle and a pair of supporting wheels on the axle, one of the wheels being fixed to the axle, the other of the wheels being rotatable upon the axle, opposed gear wheels mounted upon the axle and one secured to the axle and the other to the first named wheel, a spider rotatably mounted upon the axle between said gear wheels and bearing pinions meshing with both of said gear wheels, an annulus mounted upon the periphery of the spider, means connecting the annulus to the spider during rotation of the spider in one direction and disconnecting the same during rotation of the spider in the opposite direction, and a connection between the annulus and the member to be driven, said annulus having at one side a fixed flange abutting one side face of the spider and at the opposite side a removable flange abutting the opposite side of the spider.

3. In combination with an agricultural implement having a member to be driven, an axle and a pair of supporting wheels on the axle, one of the wheels being fixed to the axle, the other of the wheels being rotatable upon the axle, opposed gear wheels mounted upon the axle and one secured to the axle and the other to the first named wheel, a spider rotatably mounted upon the axle between said gear wheels and bearing pinions meshing with both of said gear wheels, an annulus mounted upon the periphery of the spider, said annulus having its inner wall in the form of a ratchet, dogs pivoted within notches formed in the periphery of the spider and spring urged outwardly for engagement with said ratchet teeth, and a connection between the annulus and the member to be driven.

4. In combination with an agricultural implement having a member to be driven, an axle and a pair of supporting wheels on the axle, one of the wheels being fixed to the axle, the other of the wheels being rotatable upon the axle, opposed gear wheels mounted upon the axle and one secured to the axle and the other to the first named wheel, a spider rotatably mounted upon the axle between said gear wheels and bearing pinions meshing with both of said gear wheels, an annulus mounted upon the periphery of the spider, said annulus having its inner wall in the form of a ratchet, dogs pivoted within notches formed in the periphery of the spider and spring urged outwardly for engagement with said ratchet teeth, and a connection between the annulus and the member to be driven, said annulus having at one side a fixed flange abutting one side face of the spider and at the opposite side a removable flange abutting the opposite side of the spider.

In testimony whereof I hereunto affix my signature.

LOUIS A. RIEDESEL.